April 30, 1957     S. GORAN     2,790,918
LAMINATED CORE CONSTRUCTION FOR DYNAMOELECTRIC MACHINES
Filed Nov. 29, 1954
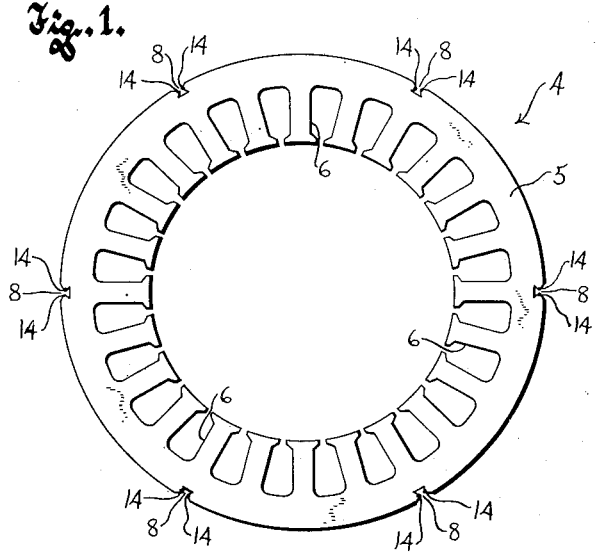
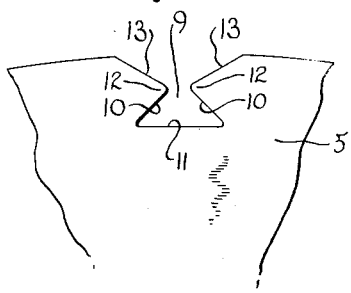
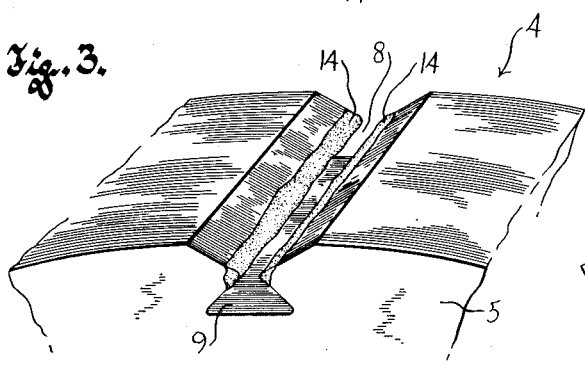
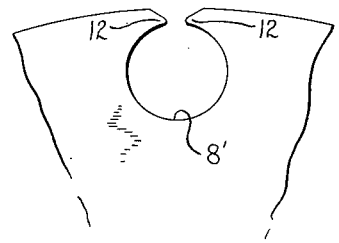
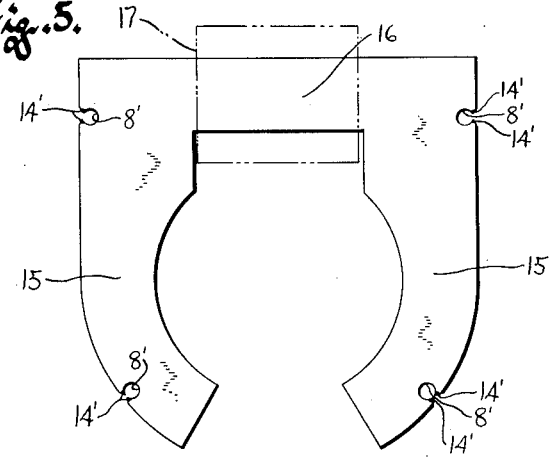

United States Patent Office 2,790,918
Patented Apr. 30, 1957

2,790,918

LAMINATED CORE CONSTRUCTION FOR DYNAMOELECTRIC MACHINES

Steven Goran, Milwaukee, Wis., assignor to The Louis Allis Company, Milwaukee, Wis., a corporation of Wisconsin Application November 29, 1954, Serial No. 471,563

5 Claims. (Cl. 310—217)

This invention relates to improvements in the construction of laminated cores for electrical machines and devices and refers more particularly to the manner in which the laminations of such cores are secured together.

Broadly, therefore, this invention is concerned with the same problem to which the L. M. Dolan, Patent No. 2,448,785, is directed. That patent discloses a laminated dynamoelectric machine core member in which the laminations are held assembled by welding together rows of teeth formed on the edge of the stack of laminations.

Experience has shown that while the patented construction is generally quite acceptable, the present invention possesses significant advantages thereover and effects a substantial improvement over the art.

Thus, it may be said that the purpose and object of this invention is to provide a laminated dynamoelectric machine core member in which the laminations thereof are secured together in an improved manner, by virtue of which the resulting core member is completely free from mechanical stress which, if it existed, would be apt to cause physical deformation or distortion of the core member and a tendency to increase core losses.

Another object of this invention is to eliminate the flux bottlenecks produced by the connections heretofore customarily employed to secure together the laminations of core members of dynamoelectric machines and other electrical devices.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 1 is an end view of a laminated stator for a dynamoelectric machine such as an electric motor, constructed in accordance with this invention;

Figure 2 is an enlarged fragmentary plan view showing a portion of one of the laminations to better illustrate an important aspect of this invention;

Figure 3 is a fragmentary perspective view illustrating a portion of the core member shown in Figure 1 to better illustrate the connections by which its several laminations are secured together;

Figure 4 is a fragmentary plan view similar to Figure 2, to illustrate a modified embodiment of the invention; and Figure 5 is an elevational view of a laminated frame or pole structure of the type used in magnetos, with its laminations secured together in accordance with this invention.

Referring to the accompanying drawing, the numeral 4 designates generally a laminated stator core of the type used in dynamoelectric machines, such as electric motors, and which as is customary, comprises a stack of identical circular laminations 5 punched or stamped from suitable sheet metal, and provided with the customary winding slots 6 which open to the inner edge or bore of the core member.

The outer edge or periphery of the core member has a number of transverse slots 8 therein formed by aligned notches 9 in the individual laminations. These notches and the grooves they form constitute a vital part of this invention as will be seen as the description proceeds.

In the form of the invention illustrated in Figures 1, 2, and 3, the notches 9 may be said to have a reentrant or dovetail shape with converging sides 10 and a straight bottom edge 11 perpendicular to a radian drawn through the center of the notch. This shape produces two opposing points 12 contiguous to the outer periphery of the lamination, and preferably the outer edges 13 of these points are inclined inwardly so that the tips of the points lie beneath the circumference of the lamination.

It is important to note that the total depth of each slot 8 is slight, and that because of its reentrant shape, the rows of points 12 defining its mouth or side edges are effectively isolated from the body of the core member.

The laminations are secured together by welding or fusing the tips of the points 12 of adjacent laminations to one another. This produces two closely adjacent parallel solid metal connections 14 extending transversely across the stack of laminations at each of the slots 8.

Preferably, the notches 9 in the peripheral portions of the laminations are so located around the circumference thereof that the slots 8 formed by these notches extend straight across the stack, but if desired they may be so placed that the transverse slots extend obliquely across the stack. Hence, it is to be understood that where the slots 8 are defined herein as transverse to the stack of laminations, absolute parallelism with the core axis is not necessarily implied.

The number of these paired connections 14 required to securely hold the stack of laminations together, of course, depends upon the size of the core member. For purposes of illustration, but not limitation, it might be noted that for a motor stator on the order of 7 to 8 inches in diameter, six such pairs of connections 14 provide a very rigid and solid construction.

Because of the relatively slight distance between the tips of the opposing rows of points 12 both fused or welded connections 14 of each pair may be formed at once. This is preferably done by means of the heliarc process in which an arc is struck in a non-oxidizing, controlled atmosphere (such as afforded by the use of helium or argon) between the work to be heated, and a tungsten electrode. In the formation of the welds or fused connections 14, the tungsten electrode is brought into bridging relationship with the tips of the opposing rows of points 12 and then swept across the stack of laminations. Because of the small mass of the points 12 one relatively fast pass across the stack brings the tips to the fusion temperature and fuses or welds them together without the need for depositing additional metal thereon.

The isolation of the points 12 from the rest of the core structure, which results from the shape of the notches and the grooves formed thereby as described above, assures against the conduction of heat into the body of the core member. Accordingly, there is not the slightest danger of creating internal stresses in the core, which, if they existed, might cause physical distortion of the core to the extent of requiring corrective machining of its bore, as well as serious disturbance of the magnetic characteristics of the structure.

Some slight irregularities in the surfaces of the connections 14 are of course, to be expected, but since the tips of the points lie beneath the circumference of the core member, and the welds are confined to the tips, any such irregularities will not form protrusions beyond the circumference. There is, therefore, also no need for corrective machining or dressing of the peripheral surface of the core member after the welds are formed.

The shallow depth of the notches 9 and the disposition of the connections 14 directly adjacent to the outer periphery of the core member assures against the formation of objectionable flux bottlenecks in the zones lying between the bottoms of the slots 8 and the adjacent winding slots 6. Also, since the core member is in nowise stressed physically during the formation of the welds or fused connections 14, the molecular structure of these zones is not affected in any way which might change the magnetic properties of the metal of which the laminations are made; and since the welds or fused connections 14 are very small in cross section, their resistance is so high that any short circuiting effect they might have upon current in the core is negligible.

The small mass of the points 12 and the high concentration of heat at their tips has the further advantage of eliminating sputtering and blowing of the arc by the release of volatiles from substances with which the laminations may be coated as for instance, the varnish used on so-called core plate.

From the standpoint of assuring the least possible reduction in metal thickness between the winding slots and the slots 8, the described squat dovetail shape of the latter is no dobut best, but as will be readily apparent, the advantages of the invention will be attained to a large extent with variations of this described reentrant shape for the slots 8. Thus, for instance, these slots may have a round shape as shown at 8, in Figure 4; and though it is, of course, best to have both edges of the slots defined by the points 12 fused together to provide two closely adjacent welds or connections 14, the fusion of only one row of points or only one side edge of each slot may be sufficient in some cases.

Obviously also, the invention is not limited to any particular core member. It can be used to advantage wherever the laminations of a core or pole member must be secured together, as for instance, the main pole pieces and the interpole pieces of a direct current motor. Another instance where the invention is especially useful is illustrated in Figure 5 which shows the invention applied to a laminated frame for a magneto in which diametrically opposite poles 15 are connected by a core portion 16 which is usually encircled by a coil 17. The laminations of the frame are secured together by welds or fused connections 14' in all respects identical to those heretofore described.

The heliarc method is no doubt best suited to the formation of the welded or fused connections 14, but good results are also attainable if ordinary arc welding technique is used to fuse the adjacent tips of the opposing rows of points, and even conventional brazing may be resorted to, the important thing being that the notches which define the points are of such shape that the opposing tips and edges of the transverse slots defined thereby are relatively close together, and that the points have relatively small mass.

From the foregoing description taken in connection with the accompanying drawing, it will be readily apparent to those skilled in the art that this invention provides an improved laminated core construction for dynamoelectric machines and devices.

What I claim as my invention is:

1. An electric core member comprising: a stack of laminations, each of which has an undercut reentrant shaped notch in one marginal edge portion thereof, so as to define opposed relatively closely spaced points contiguous to said marginal edge of the lamination, the outer edges of said points being directed inwardly from the adjacent edge of the lamination so that the points and especially their extremities are spaced from and lie beneath the marginal edge of the lamination; the notches of all of said laminations being in line so that collectively they form an undercut slot transversely across the stack of laminations with said points defining the mouth of the slot and lying beneath the adjacent surface of the stack; and means securing said points of adjacent laminations together to thereby hold the stack of laminations assembled, said means comprising welds by which the points are fused together beneath the surface of the stack.

2. The dynamoelectric machine core member of claim 1 wherein each notch and hence the slot formed by the notches has a squat dovetail shape.

3. The dynamoelectric machine core member of claim 1 wherein each notch and hence the slot formed thereby has a substantially round shape.

4. The dynamoelectric machine core member of claim 1 wherein the depth of each notch and hence the slot formed thereby is substantially no greater than the maximum width thereof.

5. As an article of manufacture a punched or stamped lamination for use in building up a laminated core member for a dynamoelectric machine, characterized by the provision of a reentrant shaped notch in one marginal edge portion of the lamination defining a pair of opposed points contiguous to said edge of the lamination and overlying the bottom of the notch so that said points are substantially isolated from the rest of the lamination, the outer edges of the points being inclined away from the adjacent marginal edge of the lamination so that said points and especially their extremities are spaced from and lie beneath the marginal edge of the lamination.

References Cited in the file of this patent

UNITED STATES PATENTS

| 2,448,785 | Dolan | Sept. 7, 1948 |

FOREIGN PATENTS

| 167,285 | Switzerland | May 1, 1934 |